United States Patent [19]

Speakman

[11] Patent Number: 4,587,833
[45] Date of Patent: May 13, 1986

[54] STAKING SYSTEM

[75] Inventor: Eugene R. Speakman, Fullerton, Calif.

[73] Assignee: McDonnell Douglas Corporation, Long Beach, Calif.

[21] Appl. No.: 684,988

[22] Filed: Dec. 24, 1984

Related U.S. Application Data

[63] Continuation of Ser. No. 539,474, Oct. 6, 1983, abandoned, which is a continuation-in-part of Ser. No. 516,861, Jul. 25, 1983, abandoned.

[51] Int. Cl.[4] ............................................. B21D 37/00
[52] U.S. Cl. ...................................................... 72/465
[58] Field of Search ..................... 72/465; 83/657, 696; 30/360; 408/204

[56] References Cited

U.S. PATENT DOCUMENTS

| | | | |
|---|---|---|---|
| 24,835 | 7/1859 | Warren | 83/696 |
| 1,567,713 | 12/1925 | Corser et al. | 72/465 |
| 2,778,091 | 1/1957 | St. Palley | 408/204 |
| 2,829,545 | 4/1958 | Eckold | 72/465 |
| 3,408,731 | 11/1968 | Mercier | 29/511 |
| 3,419,876 | 12/1968 | Edwards et al. | 29/511 |
| 3,498,100 | 3/1970 | Gudish et al. | 72/348 |
| 3,535,006 | 10/1970 | Orkin et al. | 384/206 |
| 4,132,105 | 1/1979 | Ladin | 308/DIG. 11 |

Primary Examiner—Lowell A. Larson
Attorney, Agent, or Firm—Gregory A. Cone; George W. Finch; Donald L. Royer

[57] ABSTRACT

Liner bushings and bearing assemblies are securely captured within their receiving holes by a new staking system. The inner and outer surfaces of the webs of metal adjacent the actual staking groove which are to be bent over or staked are fabricated such that these surfaces are substantially parallel to each other over the majority of the surfaces. The staking process is advantageously accomplished by use of a self-aligning staking anvil which has a gap in its circumference in order that the tool may conform exactly to the staking groove. Additionally a master matching gauge ensures proper installation.

2 Claims, 7 Drawing Figures

STAKING SYSTEM

This is a continuation of application Ser. No. 539,474, filed Oct. 6, 1983, now abandoned which is a continuation-in-part of Ser. No. 516,861, filed July 25, 1983 now abandoned.

BACKGROUND OF THE INVENTION

1. Field of the Invention

This invention relates to staking grooves used to retain bearings and liner bushings within their receiving holes.

2. Description of the Prior Art

Staking grooves are a very common way of retaining a bearing or a bushing within a receiving hole. Commonly the bearing or bushing has formed within it adjacent its outer circumference a groove normally having an included angle of about 60°. Once the bearing or bushing is inserted into its receiving hole, some sort of tool such as a staking anvil or a center punch is forced into the staking groove to bend over at least one of the webs of metal adjacent the staking groove in order to fold this web of metal over onto a corresponding receiving beveled surface machined into an appropriate location of the receiving hole. When the staking process is done correctly, the staking serves to retain the bearing or bushing within the receiving hole by means of this crimping or folding over action of the web of metal adjacent the staking groove. Insofar as is known, however, the staking grooves utilized in the past have all been of the so-called "Grumman" type characterized by the groove having walls which are at 60° to one another. In installations of bushings or bearings which will encounter thrust loads parallel to the axis of rotation of the bearing, the Grumman groove is an inadequate retention means. This is because the relatively thick basal portion of the web of metal which is bent over does not bend as much as does the upper, thinner part of the web. This causes a radiused bend in the staked web which allows for a finite amount of creep or slippage between the outer surface of the bushing or bearing and the receiving hole. There is a clear need for an improved staking groove system in which this undesirable radiused staked web is eliminated.

The crimping or staking of the web in the staking groove can be accomplished by a number of different tools. For instance, center punches are commonly used for this purpose. More effective, however, is a specialized staking anvil which, in its normal configuration, comprises a hollow cylinder, one end of which is appropriately beveled such that when forced down into the receiving staking groove, the staking anvil will act to bend over and stake down the deformable web or webs of the staking groove in the bearing assembly or liner bushing. Unfortunately, unless the working end of the cylindrical staking anvil is exactly congruent to the configuration of the staking groove, the conventional staking anvil will work and chatter its way around, either resting predominately on the inside web of the staking groove or on the outside web of the staking groove and will not make complete contact with both web surfaces. This results in a less than desired staking action by the conventional staking anvil.

SUMMARY OF THE INVENTION

The improved staking groove of this invention is formed in a circular element such as a bearing or a bushing which is to be received within a hole, which in turn has a beveled receiving edge. The staking groove is a groove which is adjacent to the outer circumference of the circular element wherein at least the outer web, defined between the outer circumferential surface of the element and the outer surface of the groove, is formed such that its defining surfaces are parallel to each other over the majority of the web such that, when staked, the outer web conforms to the beveled receiving edge of the hole without a significant therebetween.

Additionally, the web of the staking groove may be effectively staked by use of a self-aligning staking anvil which comprises a hollow, cylindrical tool element having a working edge beveled appropriately to stake at least one web adjacent a circular staking groove to a receiving beveled surface wherein the tool element itself has a gap in its circumference perpendicular to its working edge. The gap is of sufficient width such that the working edge of the tool element may conform exactly to a variety of staking grooves requiring the same working edge bevel but different circumferences.

DETAILED DESCRIPTION OF THE INVENTION

Figure 1:
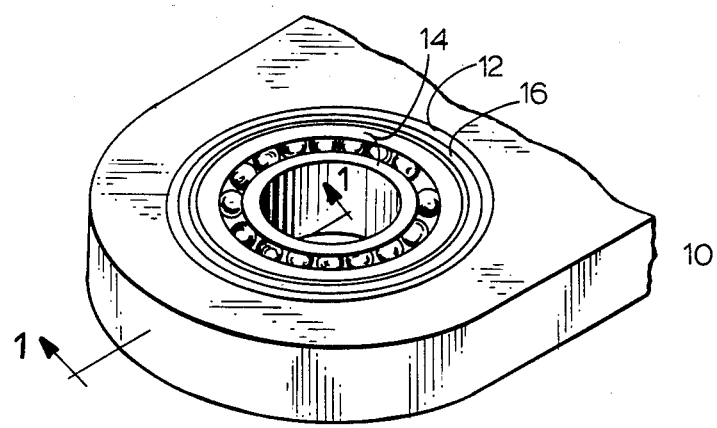
FIG. 1 is an isometric view of a typical staking groove installation, herein a liner bushing surrounding a bearing assembly.

Turning to the drawings, FIG. 1 is an isometric view of a typical installation of a bearing assembly 14 contained within a hole in a load bearing element 10 by a bushing 12 which contains a staking groove 16, here shown as being staked down to the edge of the hole in the load receiving element 10. Section lines 1—1 are shown which will useful in succeeding drawing views.

Figure 2:
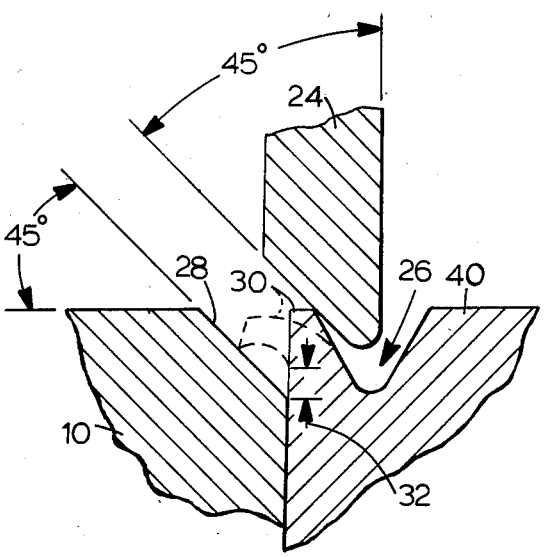
FIG. 2 is a partial cross sectional view showing a prior art staking groove installation.

FIG. 2 is a partial cross sectional view showing a typical prior art staking groove installation. The element 40 here inserted into the hole in the load receiving element 10 is shown with a typical prior art Grumman groove of 60°. The solid line outer web 30 formed between the outer circumferential edge of the inserted element 40 in the outer edge of the groove 26 is bent over or crimped or staked by the action of the staking anvil 24. The edge 28 of the hole has been beveled at an angle of 45°. This corresponds to the angle found on the bevel of the staking anvil 24 which is also 45°. When the staking anvil 24 is forced down into the staking groove 26, the outer web 30 is staked over as shown by the dotted line web 30. This staked web 30 then contacts the beveled edge 28 of the hole and serves to retain the inserted element 40 within the hole. However, it is important to note the dimension 32 which emphasizes the non contacted portion of the staked web 30. This dimension 32 represents the shortcomings in this prior art 60° Grumman groove in that the staked web 30 only touches the beveled edge 28 of the receiving hole in a small area. Fatigue in the staked web 30 resulting from thrust loads on the inserted element 40 will act to break loose the inserted element 40 from its receiving hole.

Figure 3:
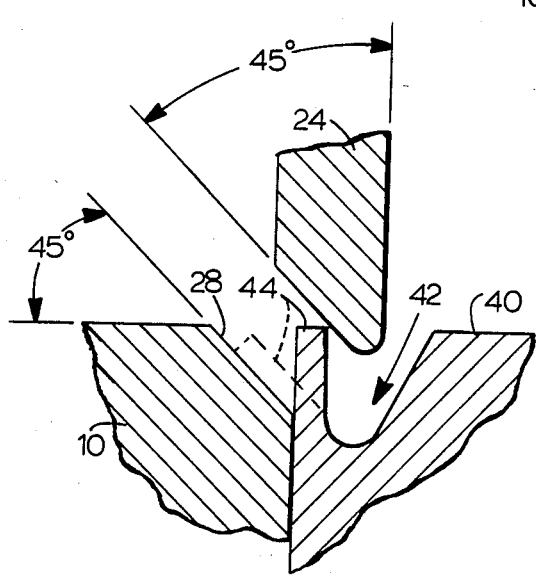
FIG. 3 is a partial cross sectional view showing the improved staking groove of the present invention.

FIG. 3 is another partial sectional view showing the improved staking groove of the present invention. As before the inserted element 40 is received within a hole in the load receiving element 10. The edge 28 of the receiving hole is beveled as before. Also, the angle of the beveled edge 28 is here 45° corresponding to the beveled working edge of the staking anvil 24. The particular angle need not be 45° in all applications; however, this has evolved as standard practice in the industry. What is important is that the bevel angle on the staking anvil 24 corresponds to the bevel edge 28 of the receiving hole. The improved groove 42 has its outer web, defined as before between the outer circumferential edge of the inserted element 40 and the outer edge of the groove 42, shown in both solid and dotted lines as 44. The solid line web 44 corresponds to its position prior to staking and the dotted line web 44 corresponds to its position after staking. Notice that the inner and outer defining surfaces of the web 44 are parallel here. This is in marked contrast to the prior art staking groove shown in FIG. 2 is which there is a large gap in the contact between the staking web and the receiving hole edge. The inside edge of the groove 42 is inclined at an angle of about 30° relative to the circumferential edge of the inserted element 40 in applications where this inside web will not be staked. It should be noted that it is not absolutely mandatory that the inner and outer defining surfaces of the outer web 44 be exactly parallel to one another. It may be that the base of the web 44 is slightly thicker than the upper portion of the web 44. What is important is that when staked, the web 44 contacts the receiving portion of the hole along essentially all of its outer surface.

Figure 4:
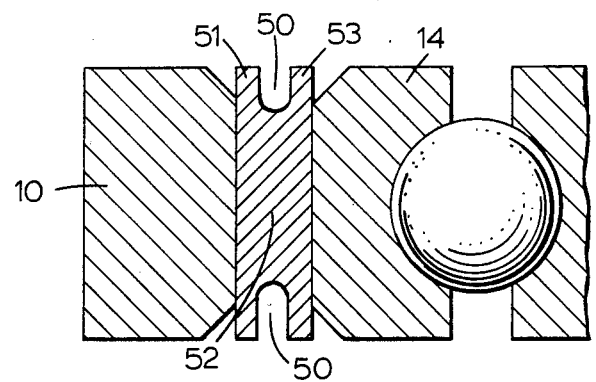
FIG. 4 is a partial cross sectional view taken along sectional lines 1—1 of FIG. 1 showing a variation of the improved staking groove of the present invention.

FIG. 4 is a partial cross sectional view taken along sectional lines 1—1 of FIG. 1 and shows a typical installation in which a roller bearing assembly 14 is surrounded by a liner bushing 52 which is received within a hole in a load receiving element 10. In this embodiment, the improved staking groove is slightly different than that shown in the preceding FIG. 3 in that both webs of the staking groove 51 and 53 have the substantially parallel defining surfaces since both are to be staked down onto receiving surfaces. Here the receiving surfaces are: first, on the beveled edge of the receiving hole and the load bearing element ten, and second, on the outer edge of the bearing assembly 14. Note also that the outer web 51 is shown as being slightly rolled inwardly towards the center of the groove 50. This is a common installation technique useful in all of the staking grooves discussed in this invention. Since the outer webs of the staking grooves are slightly rolled inwardly, it is much easier to insert the element which contains the staking groove into the hole in the load bearing element 10. Of course, once the various elements of the assembly 10, 52, and 14 are lined up properly, the webs 51 and 53 and their counterparts on the lower surface of the liner bushing 52 are staked down outwardly onto their respective receiving surfaces.

Figure 5:
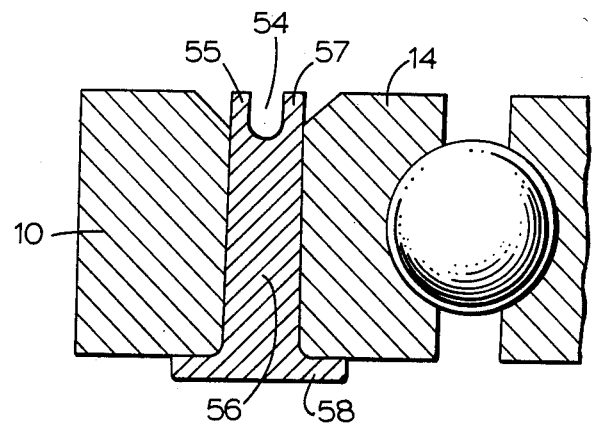
FIG. 5 is a partial cross sectional view taken along sectional lines 1—1 of FIG. 1 showing another variation of the improved staking groove of the present invention.

FIG. 5 shows another embodiment of the improved staking groove of the present invention shown here also as a partial cross sectional view taken along sectional lines 1—1 of FIG. 1. Here the bottom webs of the liner bushing 52 have been replaced with a flange 58. In this application, the liner bushing must be inserted from below. As before, the bearing assembly 14 is found inwardly of the liner bushing 56, both of which are enclosed in the hole in the load receiving element 10. The upper webs of the groove 54 are here labeled 55 and 57. Again, the webs 55 and 57 are shown as being slightly rolled inwardly to ease installation. As before, a staking anvil of some sort would be inserted into the groove after all of the elements are correctly lined up in order to stake down the webs 55 and 57 onto the respective receiving surfaces of the bearing assembly 14 and the load bearing element 10.

Figure 6:
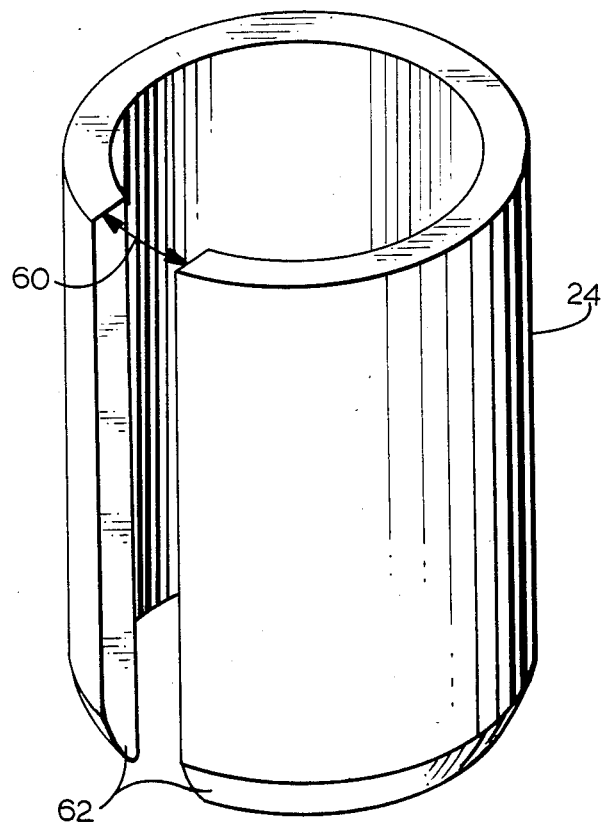
FIG. 6 is an isometric view of the improved self aligning staking anvil useful in the practice of this invention.

FIG. 6 is isometric view showing the improved self-aligning staking anvil of this invention. The improved self-aligning tool 24 is anotherwise ordinary staking anvil having a bottom working edge shown here with the beveled surfaces 62. The distinguishing characteristic of the self-aligning staking anvil 24 is that it has a gap 60 in its circumference perpendicular to the bottom working edge. The gap 60 allows the circumference of the working edge 62 of the tool 24 to conform exactly to the circumference of the staking groove upon which it will act. Variations in the circumference of the staking groove compared to the relaxed circumference of the staking anvil will be taken up by a relative opening or closing of the gap 60 to adjust the exact circumference of the tool 24 to the receiving staking groove. The prior art staking anvils are solid tools which do not include this gap. Hence, they are unable to adapt their circumferential dimension to staking grooves which have varying circumferences. Notice, however, that the beveled angle on the working edge 62 of the improved staking anvil 24 will be constant regardless of the change in circumference due to the opening or closing of the gap 60. The embodiment shown has only a single bevel to the working edge since, in the shown embodiment, only the outside web adjacent the staking groove is staked. In other applications such as those shown in FIGS. 4 and 5 wherein both webs adjacent the groove are staked, the working edge of the staking anvil will have a double bevel contour in order that both webs be staked, such that the thickness of the anvil is increased and the bevels will appear on both the inside and outside of the working edge.

Figure 7:
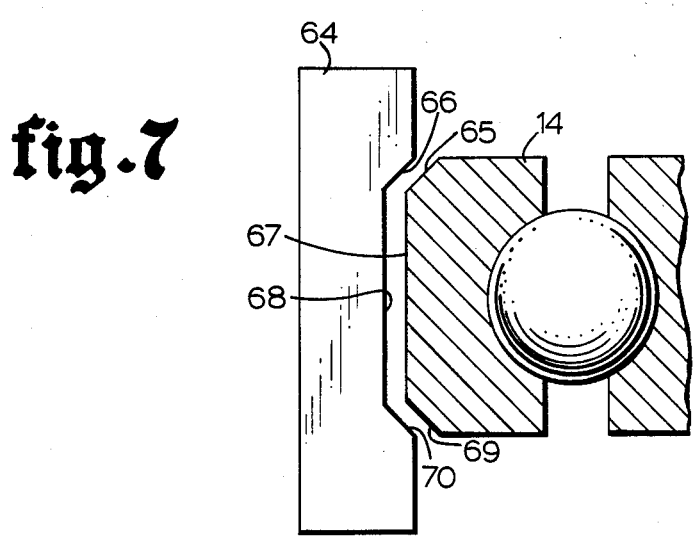
FIG. 7 is a cross sectional view showing the master matching gauge of the present invention.

In applications involving staking of liner bushings between a receiving hole and an interior bearing assembly, there is a common machining problem which results when the beveled surfaces of the receiving hole are formed. In order for the staking installation to be of optimum strength, it is necessary that the bevel on the outside edges of the bearing assembly received on the interior of the liner bushing be precisely the same as the bevels on the receiving hole to the outside of the liner bushing. If these bevels do not match reasonably precisely; that is, if the bevel on the hole is, for example, deeper than is the corresponding bevel on the bearing assembly, the staking tool will preferentially bend the web of the staking groove into good contact only with the receiving edge which has the shallower bevel. To this end, a master matching guage 64 has been developed as shown in FIG. 7. This master matching guage 64 is normally formed of thin sheet stock and is of sufficient length to completely penetrate the depth of the receiving hole. Formed into one of its longitudinal edges is a profile which matches precisely with the known profile of the bearing assembly 14 to be used in the installation. Shown in the figure are the beveled edges 65 and 69 of the bearing assembly 14 along with its own beveled circumferential outer surface 67. Matching precisely to this profile are the beveled edges 66 and 70 of the master matching guage 64 and the unbeveled edge 68. The master matching guage 64 would then be reversed by the machinist preparing the beveled surfaces on the receiving hole and used as a matching guage to precisely align the beveled surfaces between the receiving hole and the bearing assembly 14.

I claim:

1. A self-aligning staking anvil comprising a hallow, cylindrical tool element having a working edge beveled appropriately to stake at least one web adjacent a circular staking groove in a workpiece to a receiving beveled surface wherein the tool element has a gap in its circumference substantially perpendicular to its working edge of sufficient width such that the staking anvil has sufficient strength to resist longitudinal deformation under normal usage but will change its effective diameter by self-adjustment of the width of the gap during a staking operation to accommodate a variety of workpieces having staking grooves of differing diameters but with the requirement for the same working edge bevel.

2. The self-aligning staking anvil of claim 1 wherein the bevels on the working edge of the tool element match the bevels on the respective receiving surfaces.

* * * * *